VOLUME LIMITING CIRCUITS

Filed Feb. 3, 1945 2 Sheets-Sheet 1

INVENTOR.
Robert E. Schock
BY
H. S. Grover
ATTORNEY.

VOLUME LIMITING CIRCUITS

Filed Feb. 3, 1945 2 Sheets-Sheet 2

INVENTOR.
Robert E. Schock
BY
H. S. Grover
ATTORNEY.

Patented May 23, 1950

2,509,077

UNITED STATES PATENT OFFICE 2,509,077

VOLUME LIMITING CIRCUITS

Robert E. Schock, Riverhead, N. Y., assignor to Radio Corporation of America, a corporation of Delaware Application February 3, 1945, Serial No. 576,031

9 Claims. (Cl. 250—20)

My present invention relates to volume limiting systems generally, and more specifically to volume burst control circuits for carrier-exalted receivers.

In his application Serial No. 577,902, filed February 14, 1945, Murray G. Crosby has shown a receiving system constructed and arranged to receive amplitude modulated (AM) or phase modulated (PM) signals so that the effects of selective carrier fading are very greatly reduced. In general, this is done by dividing the received signal (AM or PM) into two paths. The signal in one path is filtered through a piezo-electric crystal filter network, and the filtered and exalted carrier is then limited. The signal in the second path is recombined, after amplification, with the filtered carrier in a demodulator. An automatic frequency control (AFC) detector operating out of the crystal filter network holds the signal mean frequency at a value such that it falls in the center of the pass band of the crystal filter network. In the case of AM signal reception the demodulator provides the audio frequency signals, and concurrently reduces the effect of selective carrier fading due to the carrier-exaltation function. In the case of PM signal reception the demodulator performs to provide the same results.

The receiving system uses an automatic volume control (AVC) to regulate the various selective amplifiers up to the point where the signal is divided into two paths. The rectifier of the AVC circuit is fed with the unfiltered signal energy, and overcomes the effect of relatively slow fading of the modulated carrier energy. Since the greater part of the modulation signal is in the carrier, a "selective" fade leaves little energy to be rectified by the AVC rectifier. By "selective" fade is meant a fading of the carrier with respect to its modulation component frequencies. Where the selective fading affecting the signal energy is such that the carrier amplitude is greatly reduced, little energy is left for operating the AVC rectifier device. Hence, during such severe selective carrier fading interval the action of the AVC circuit is to permit the gain of the receiver to rise thereby raising the level of the sideband components which have not faded for that interval.

The carrier, being exalted or filtered out by the crystal filter network and thereafter limited in amplitude, does not fade at the demodulator during the selective-fade interval. The modulated signal energy (or the modulation sideband components) coming through an amplifier to combine with the limited filtered carrier energy at the demodulator does, however, rise in amplitude during the selective-fade interval due to the aforesaid AVC action. This rise of the sideband amplitude relative to exalted carrier amplitude, with which combination is had, results in a proportionate rise in the audio output level during selective fading. The effect on the ear may be described as a sudden short "burst" of volume above the normal level to which the receiver is set.

It is an important object of my present invention to provide improved circuits for controlling volume bursts by rectifying the audio frequency output energy, and utilizing whatever levels are above the normal level to reduce the gain at a point of the receiving system during the intervals of abnormal level.

Another object of my present invention is to provide a volume burst control system for a carrier-exalted receiver; the control system developing control bias from rectified audio signals in excess of normal operating levels, and there being utilized a delay device in the control circuit to a controlled signal amplifier feeding the carrier-exalted demodulator.

More specific objects of my present invention are to provide improved volume burst control circuits, and more especially to provide control circuits which are reliable in operation and economical of component elements.

Other features will best be understood by reference to the following description, taken in connection with the drawing, in which I have indicated diagrammatically several circuit organizations whereby my invention may be carried into effect.

Figure 1:
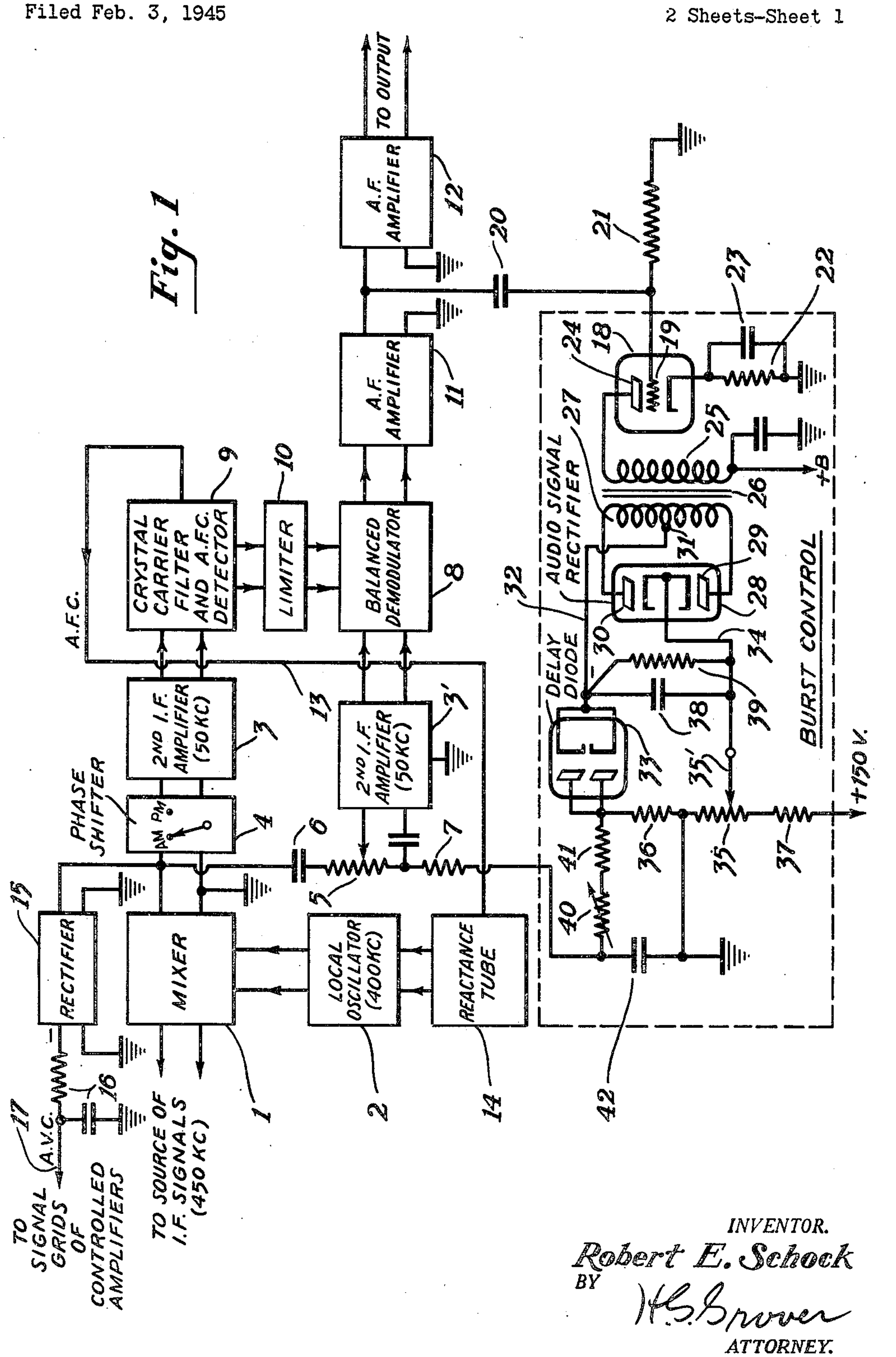
Fig. 1 shows, in partially schematic form, a carrier-exalted receiver system embodying a burst control circuit constructed in accordance with my invention.

Referring now to the accompanying drawings, wherein like reference characters in the several figures denote similar circuit elements, there is shown in Fig. 1 a carrier-exalted receiving system for either AM or PM carrier waves. Since the present application is not directed to the receiver circuits, save for the volume burst control circuit shown, and the circuits are shown in detail in the aforesaid Crosby application, the receiver is schematically represented. The present description, drawings and claims are confined to the specific improvement and such parts as necessarily cooperate with it. The receiving system is adapted to receive AM or PM signals in the high frequency ranges of 5 to 100 megacycles (mc.), although it is not limited thereto. Regardless of the character of modulation on the received carrier wave, the frequency of the latter is reduced to an intermediate frequency (I. F.) value of 450 kc. The usual high frequency and I. F. amplifiers may precede the mixer 1. If desired, the mixer may be omitted. However, the mixer is fed with the signals and with local oscillations. The latter are derived from local oscillator 2 tuned to 400 kc. The mixer output of 50 kc. is applied to a second I. F. amplifier 3, tuned to 50 kc., through a phase shifter 4. The latter is adjustable to shift the phase for PM signals 90 degrees relative to the zero phase shift position for AM signals. It is sufficient for the purposes of this application to point out that for demodulation of the PM signals it is necessary to apply the filtered carrier energy and unfiltered PM signal energy in phase quadrature to the demodulator. In the case of AM signal reception the phase difference is zero or 180 degrees.

The frequency values stated herein are, of course, purely illustrative. If desired, the I. F. amplifier 3 may be fed with 50 kc. signal energy from the combiner circuit of a diversity receiving system. That is, a plurality of separate antenna, each feeding a selective high frequency amplifier channel and frequency reducer (450 kc.) and mixer (50 kc.), could be used, and the combined output of the mixers would be applied to phase adjuster 4. To preserve simplicity of disclosure let it be assumed that AM signals are being received, and that the signals originate overseas and are subject to selective carrier fading. The AM signal energy is reduced to 50 kc., and amplified at amplifier 3 after adjustment of phase shifter 4 for "AM" reception. The AM signals are transmitted over a second path to a second amplifier 3' of the 50 kc. energy.

The input control potentiometer 5 of amplifier 3' is capacitatively coopled to the input terminals of the phase shifter network by a condenser 6. The condenser 6, also, blocks from the phase shifter 4 the burst control bias fed from the burst control circuit over resistor 7 to the control grid of the amplifier 3' through potentiometer resistor 5. The amplified 50 kc. signal energy at amplifier 3' is fed to the balanced demodulator 8. The latter generally comprises a pair of opposed diodes, the output of amplifier 3' being applied in push-pull relation to the diodes. Those skilled in the art are fully aware of the manner of constructing such a balanced demodulator.

The 50 kc. signal output of amplifier 3, the first path, is applied to a network 9 which is a carrier filter and employs a piezo-electric crystal tuned to 50 kc. The aforesaid Crosby application shows the crystal filter network in detail. The filtered carrier energy is substantially free of sideband component frequencies, and it can be said that the carrier is exalted relative to the sidebands. The filtered carrier energy is limited by amplitude limiter 10, and then the limited filtered carrier energy is applied in parallel, or push-pull, relation to the demodulator diodes. The result is to provide audio frequency voltage at the demodulator output terminals. The audio voltage is amplified, as at amplifier 11. Further audio frequency amplification may be provided, as at audio frequency amplifier 12. The amplified output of amplifier 12 may be reproduced by any desired type of loudspeaker.

The effect of selective carrier fading is overcome by virtue of the injection into demodulator 8 of the limited filtered carrier energy. In the aforesaid Crosby application it is disclosed how the crystal filter network may concurrently be employed as a sharp discriminator input circuit for an AFC detector. The AFC bias developed by the latter is transmitted over line 13 to an electronic reactance tube 14 adapted automatically to adjust the tank circuit frequency of local oscillator 2. Those skilled in the art of radio communication are well aware of the manner of construction of AFC circuits. The sharp AFC circuit possesses a high degree of control over the mid-band frequency of the signal energy at the input terminals of the crystal filter so as to keep the mid-band frequency equal to the crystal frequency.

To overcome the effects of slow fading of the received signals a suitable AVC circuit of well known construction is employed. Such a circuit comprises a rectifier 15, usually a diode, whose input terminals are fed with the 50 kc. signal output of the mixer 1. The AVC bias, whose magnitude increases in a negative polarity sense with signal amplitude, is applied over a suitable resistor-condenser time constant network 16 and lead 17 to the signal grids of respective selective high frequency amplifiers prior to mixer 1. The action of the AVC circuit is to maintain a substantially uniform signal amplitude at the input of the crystal filter regardless of relatively slow signal variations at the antenna.

Since the greater part of the modulation signal energy is in the carrier, selective fading which greatly reduces the carrier amplitude relative to the sidebands leaves little energy to be rectified by rectifier 15. Hence, during such a selective fading interval the negative bias transmitted over line 17 is a minimum, and the controlled selective amplifiers will have maximum gain. This results in an increase in the gain of the receiver thereby relatively raising the level of the sidebands which have not faded for that interval. Now the carrier, being exalted by crystal filter 9 and limited to a constant amplitude by limiter 10, does not fade at demodulator 8 during the aforesaid selective fading interval. The sidebands, in the form of unfiltered signal energy, coming through amplifier 3' to combine with the exalted or filtered carrier at demodulator 8 do, however, rise in amplitude during the selective fading interval due to the AVC action. This results in a proportionate rise in the audio frequency output level at the demodulator output during the selective fade. The effect to the ear of the listener may be described as a sudden short burst of volume above the normal level to which the receiver is set.

In general, it may be said that the disclosed burst control circuit comprises a means for rectifying the audio signals, and further means for reducing the gain of the amplifier 3' during the intervals of abnormal level. Specifically, the audio signal energy is taken from a point following the audio amplifier 11, although the point of derivation of the audio signals may be anywhere beyond the demodulator output terminals. The amplifier tube 18, a 6J5 triode for example, has its input grid 19 coupled by condenser 20 to the input terminals of the amplifier 12. The grid 19 is connected by resistor 21 to the grounded end of cathode resistor 22. The latter is bypassed by condenser 23 for audio frequency currents, and the positive voltage for plate 24 is fed through the primary winding 25 of audio transformer 26.

The amplified audio frequency output of tube 18 is applied through transformer 26 to the push-pull rectifier tube 28. The latter may be, for example, of the 6H6 type. The opposite ends of secondary winding 27 are connected to respective anodes 29 and 30 of the pair of opposed diodes. The midpoint 31 of winding 27 is connected by lead 32 to the common connected cathodes of delay diode 33. The common cathode lead 34 of tube 28 is connected to a slider 35′. The latter may be adjusted along a resistor 35 in series between resistors 36 and 37. The common anode lead of tube 33 is connected to a +150 volt source of current through series resistors 36, 35 and 37.

Condenser 38 is connected in shunt with load resistor 39. The latter is connected between lead 32 and lead 34. Hence, the resistor 39 functions as the rectifier output load. The diode 33 may be a single diode, or of the 6H6 type as shown. The potentiometer resistor 5 which is in circuit with the signal grid of amplifier 3′, is connected through resistor 7, adjustable resistor 40 and resistor 41 to the anode of diode 33. The condenser 42 shunts the common terminal of series-connected resistors 40 and 7 to ground.

The burst control circuit functions in the following manner. The audio signal energy applied to audio amplifier 18 is subjected to push-pull rectification. Push-pull rectification is chosen because the audio frequency wave form is often unsymmetrical, and rectification of one side only of the wave might not produce as accurate a control voltage as would be secured in the case of push-pull rectification. Again, the audio frequency peaks being relatively far apart and irregular, especially in the case of syllabic intervals of speech, it is considered desirable to rectify both positive and negative peaks to obtain a more constant level of direct current voltage output. Since it is desired that no controlling voltage reach the controlled amplifier 3′, except during abnormally high (burst) levels, the delay diode 33 is inserted between the negative side of the rectifier load resistor 39 and the control lead to the amplifier 3′, The cathode of diode 33 is supplied with a positive bias from the +150 volts supply from the voltage divider network consisting of resistor 37 and potentiometer 35 through load resistor 39. It is desired to provide a regulated positive bias voltage supply for the cathode of diode 33. This positive bias on the delay diode 33 is adjusted by varying the slider 35′ of potentiometer 35. The positive bias applied to the cathode of cathode 33 is adjusted to a value just equal to the negative voltage appearing across the rectifier load resistor 39 at normal audio peak levels.

Accordingly, this negative voltage across resistor 39 cannot cause the cathode to become negative with respect to the plate or anode side of diode 33, until it exceeds the value of the positive delay bias applied to the cathode of the diode. During burst intervals the negative voltage across resistor 39 does exceed this delay bias thereby causing the delay diode 33 to become conductive. This results in the resultant negative voltage appearing at the delay diode anode across resistor 36. The voltage across resistor 36, of course, appears also at the signal grid of the amplifier 3′, because the signal grid of amplifier 3′ is directly connected to the anode of diode 33 through the path consisting of resistors 5, 7, 40 and 41. Resistor 41 and variable resistor 40 together with condenser 42 form a time constant network determining the speed with which the controlling voltage can operate on the signal grid of amplifier 3′.

After the burst has been suppressed, the gain of amplifier 3′ returns to normal by virtue of the condenser 42 discharging more slowly through resistors 40, 41 and 36. It is further pointed out that the delay tube 33 would not be needed during those intervals when the positive delay bias and the negative bias developed across resistor 39 are equal. However, without diode 33 the positive voltage would appear on the signal grid of amplifier 3′ during audio passages of low level, or intervals of silence when the rectifier output is low, or at zero level, and, therefore, could not balance the positive delay voltage.

Figure 2:
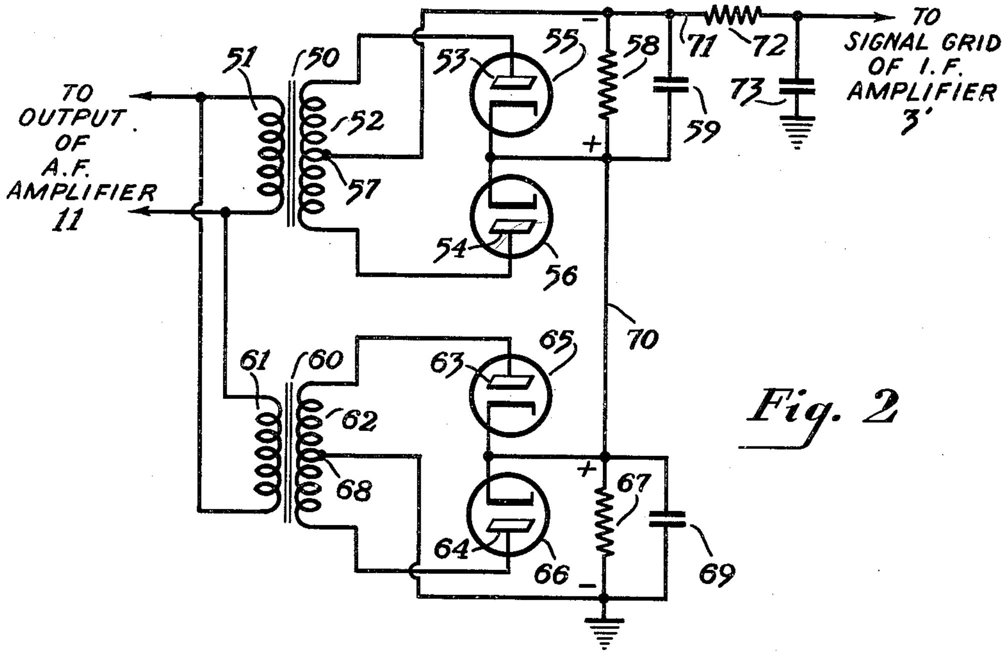
Fig. 2 shows a modified burst control circuit.

In Fig. 2 I have shown a modification of the burst control circuit wherein the audio signal energy derived from the output terminals of audio frequency amplifier 11 is fed through two paths to the primary windings 51 and 61 of the audio frequency transformers 50 and 60 respectively. The secondary winding 52 of transformer 50 has its opposed ends connected to the respective anodes 53 and 54 of a pair of opposed diodes 55 and 56. The common cathode connection of the opposed diodes is connected through the load resistor 58 to the midpoint 57 of the secondary winding 52. Condenser 59 shunts the load resistor 58.

The secondary winding 62 of transformer 60, also, has its opposed ends connected to the respective anodes 63 and 64 of the diodes 65 and 66 respectively. The resistor 67 is connected as an output load from the midpoint 68 of winding 62 to the common cathode connection of the opposed diodes 65 and 66. Condenser 69 shunts output resistor 67, and the anode end of resistor 67 is established at ground potential. Lead 70 connects the cathode end of resistor 58 to the cathode end of resistor 67. It will, therefore, be seen that the rectified voltages across resistors 58 and 67 are in polarity opposition relative to ground. The differential control voltage is taken off by lead 71, and is applied through the time constant network, consisting of series resistor 72 and shunt condenser 73, to the signal grid of the controlled amplifier 3′.

As was explained in connection with the burst control circuit shown in Fig. 1, it is desired that no control voltage be applied to amplifier 3′ except during undesirable volume bursts. Hence, in the system of Fig. 1 a positive delay voltage was supplied through potentiometer 35 to buck out all the negative control voltage generated across resistor 39 below the predetermined volume level. In the system of Fig. 2 the positive bucking voltage is supplied by the push-pull rectifier comprising the opposed diodes 65 and 66 and their output load 69 and 67. This rectifier circuit is the same as the one comprising opposed diodes 55 and 56 and their output elements 58 and 59, except that condenser 69 is made much larger than condenser 59. In operation, therefore, the positive voltage developed across load resistor 67 is equal and opposed to the negative voltage developed across resistor 58 so long as the voltage changes of the audio frequency voltage being rectified are gradual.

If, however, there is a sudden burst in volume then load circuit 58, 59, with its relatively faster time constant, builds up a negative voltage at the time of the volume burst. However, the load circuit 67, 69 with its slower time constant cannot build up a positive opposing voltage in time to balance out the negative voltage generated by the burst across load circuit 58, 59. Therefore, for the duration of the volume burst there is a net negative voltage across the differentially connected load circuits which will appear on the output lead 71. There is an advantage in the operation of this modification over that shown in Fig. 1, in that during low volume passages of program level the positive voltage across load circuit 67, 69 goes down to, or near, the same level as that reached by the negative voltage across load circuit 58, 59. Any negative voltage generated by a volume burst while operating at this low volume level is, therefore, available for control. In the case of the burst control circuit of Fig. 1 where the positive bucking voltage is fixed in value, the negative voltage generated by a burst of volume during a low volume passage of program level will not be available for control until it reaches the level of the fixed positive voltage. In other words the modification of Fig. 2 has the advantage that the positive bucking or delay voltage follows the negative control voltage during gradual changes in level so that at any level of volume a burst will immediately generate a controlling voltage.

If, in operation, the audio input level drops suddenly, as at the end of a program or between passages in a program, the negative voltage across the load circuit 58, 59 will drop off at about the rate the program level drops off. However, the positive voltage across the slow time constant circuit 67, 69, will drift down slowly. Therefore, during such periods there will be a net positive voltage at the output lead 71. This will be undesirable in most cases, because it boosts the gain of amplifier 3′ between program passages and may bring in noise. Accordingly, in Fig. 3 I have shown a modification of the system shown in Fig. 2, wherein a diode 80 is inserted between the anode end of resistor 58 and the filter resistor 72. The diode 80 has its cathode 81 connected to the upper end of resistor 58, while its anode 82 is connected to the resistor 72.

Figure 3:
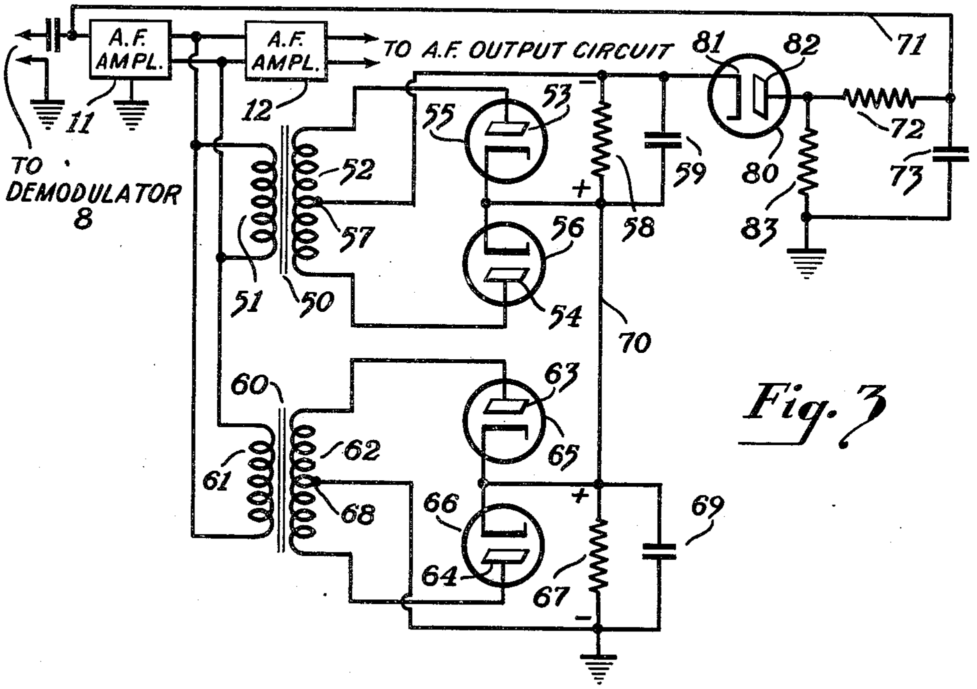
Fig. 3 is a circuit diagram of a further modification of the burst control circuit.

The diode 80 blocks positive voltage from reaching the output lead 71. Resistors 83 and 72 and condenser 73 provide a time constant circuit through which the control voltage must pass to lead 71. The modification of Fig. 3 is substantially the same as that shown in Fig. 2, except for the insertion of diode 80 which blocks the passage of positive voltage and transmits the negative voltage. In Fig. 3 I have, also, shown that in place of applying the control voltage on lead 71 to the signal grid of I. F. amplifier 3′, the control voltage may be applied to the input signal grid of audio frequency amplifier 11 preceding the point of audio frequency transmission system from which there is derived the signal fed to the burst control circuit. It will be recognized that the gain of amplifier 11 will be quickly suppressed in the same way as has been described in connection with amplifier 3′.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In a system of the type comprising a source of modulated carrier waves subject to selective carrier fading, including at least one controlled amplifier, a demodulator, a first transmission path from said source to said demodulator including means for deriving from the modulated carrier waves energy of carrier frequency and of substantially constant amplitude, a second transmission path from said source to said demodulator for transmitting said modulated carrier waves, and means coupled to both of said paths and responsive to amplitude variations of said modulated carrier waves for regulating the gain of said controlled amplifier in a sense to overcome said variations; the improvement comprising a volume control circuit for reducing the transmission efficiency of said second path in response to said regulating means becoming relatively ineffective during intervals of selective carrier fading, said volume control circuit comprising a rectifier circuit coupled to the output circuit of said demodulator and responsive to the demodulator output energy for producing an output voltage proportional thereto, auxiliary means rendering ineffective any rectifier output voltage except a voltage exceeding a predetermined value representative of a predetermined demodulator output intensity level, and means coupled to said path and responsive to said rectifier output voltage exceeding said predetermined value, in response to said demodulator output exceeding said intensity level, for reducing said second path transmission efficiency.

2. In a system of the type comprising a source of modulated carrier waves subject to selective fading, a demodulator, a first transmission path from said source to said demodulator including means for deriving from the modulated carrier waves energy of carrier frequency and of substantially constant amplitude, a second transmission path from said source to said demodulator for transmitting said modulated carrier waves, and means coupled to said source and responsive to amplitude variations of said modulated carrier waves for regulating the gain of the system prior to said demodulator in a sense to overcome said variations; a volume control circuit for reducing the transmission efficiency of said second path in response to said regulating means becoming relatively ineffective during intervals of selective carrier fading, said volume control circuit comprising a push-pull rectifier circuit coupled to the output circuit of said demodulator and responsive to the demodulator output energy for producing a rectified output voltage proportional thereto for all values of said output energy, a source of unipotential voltage connected in series opposition with said rectified output voltage, the amplitude of said constant voltage being such that the resultant voltage does not exceed a predetermined value, for demodulator output levels below a predetermined intensity level, means coupled between the output circuit of said rectifier and said second path and responsive to said rectified output voltage exceeding said predetermined value, in response to said demodulator output exceeding said intensity level, for reducing said second path transmission efficiency, said last responsive means including a diode connected to prevent said unipotential voltage from affecting said second path.

3. In a signal-modulated carrier wave receiving system including a carrier wave signal amplifying channel, a signal demodulator, a first transmission path extending from said channel to said demodulator and including means for deriving, from the signal-modulated carrier wave, energy of carrier frequency and of substantially constant amplitude, a second transmission path extending from said source to said demodulator for conveying signal-modulated carrier waves and including a carrier wave responsive device, means coupled to said channel for developing a first unidirectional amplifier gain controlling voltage having a varying magnitude dependent upon the amplitude of said signal-modulated carrier waves, means coupling said first unidirectional voltage developing means to said channel for regulating the gain thereof in a sense to overcome amplitude variations of said signal-modulated carrier waves, a volume control circuit including a rectifier coupled to the output circuit of said demodulator for developing a second unidirectional voltage having a varying magnitude dependent upon the amplitude of said signals, means for developing a delay voltage, further means responsive to said delay voltage coupled to the output circuit of said rectifier to render ineffective any unidirectional voltage derived from said rectifier having less than the magnitude of said delay voltage, and means coupled between the output circuit of said rectifier and said carrier wave responsive device for reducing the transmission efficiency of said second path in response to signals derived from the output circuit of said demodulator exceeding a level determined by said delay voltage.

4. In a signal-modulated carrier wave receiving system including a carrier wave signal amplifying channel, a signal demodulator, a first transmission path extending from said channel to said demodulator and including means for deriving, from the signal-modulated carrier wave, energy of carrier frequency and of substantially constant amplitude, a second transmission path extending from said source to said demodulator for conveying signal-modulated carrier waves and including a carrier wave amplifier, means coupled to said channel for developing a first unidirectional amplifier gain controlling voltage having a varying magnitude dependent upon the amplitude of said signal-modulated carrier waves, means coupling said first unidirectional voltage developing means to said channel for regulating the gain thereof in a sense to overcome amplitude variations of said signal-modulated carrier waves, a volume control circuit including a rectifier coupled to the output circuit of said demodulator for developing a second unidirectional voltage having a varying magnitude dependent upon the amplitude of said signals, means including an impedance device coupled to the output circuit of said rectifier providing a unidirectional delay voltage having a polarity opposite to that of said second unidirectional voltage to render ineffective any unidirectional voltage derived from said rectifier having substantially less than the magnitude of said delay voltage, and means coupled between the output circuit of said rectifier and the gain controlling circuit of said relatively low frequency signal modulated carrier wave amplifier for reducing the transmission efficiency of said second path in response to signals derived from the output circuit of said demodulator exceeding a predetermined level.

5. In a signal-modulated carrier wave receiving system including a relatively high frequency carrier wave signal amplifying channel, a signal demodulator, a first transmission path extending from said channel to said demodulator and including means for deriving, from the signal-modulated carrier wave, energy of carrier frequency and of substantially constant amplitude, a second transmission path extending from said source to said demodulator for conveying signal-modulated carrier waves and including a relatively low frequency carrier wave amplifier, means coupled to said channel for developing a first unidirectional amplifier gain controlling voltage having a varying magnitude dependent upon the amplitude of said signal-modulated carrier waves, means coupling said first unidirectional voltage developing means to said channel for regulating the gain thereof in a sense to overcome amplitude variations of said signal-modulated carrier waves, a volume control circuit including a rectifier coupled to the output circuit of said demodulator for developing a second unidirectional voltage having a varying magnitude dependent upon the amplitude of said signals, means including a resistor constituting a source of unidirectional delay voltage coupled to the output circuit of said rectifier, said unidirectional delay voltage having a polarity opposite to that of said second unidirectional voltage to render ineffective any unidirectional voltage derived from said rectifier having materially less than the magnitude of said delay voltage, and means including a unilaterally conducting device coupled between the output circuit of said rectifier and the gain controlling circuit of said relatively low frequency signal-modulated carrier wave amplifier for reducing the transmission efficiency of said second path in response to signals derived from the output circuit of said demodulator exceeding a predetermined level.

6. In a signal-modulated carrier wave receiving system including a carrier wave signal amplifying channel, a signal demodulator having an output circuit, circuit connections providing a first signal transmission path extending from said channel to said demodulator and including means for deriving, from the signal-modulated carrier wave, energy of carrier frequency and of substantially constant amplitude, circuit connections providing a second signal transmission path extending from said source to said demodulator for conveying signal-modulated carrier waves and including a carrier wave responsive device, means coupled to said signal amplifying channel for developing a first unidirectional amplifier gain controlling voltage having a varying magnitude dependent upon the amplitude of said signal-modulated carrier waves, means coupling said first unidirectional voltage developing means to said channel for regulating the gain thereof in a sense to overcome amplitude variations of said signal-modulated carrier waves, a volume control circuit including a first rectifier coupled to the output circuit of said demodulator for developing a second unidirectional voltage having a varying magnitude dependent upon the amplitude of said signals, means for developing a delay voltage including a second rectifier circuit coupled to the output circuit of said demodulator, further means responsive to said delay voltage coupled to the output circuit of said rectifier to render ineffective any unidirectional voltage derived from said rectifier having less than the magnitude of said delay voltage, and means coupled between the output circuit of said rectifier and the said carrier wave responsive device for reducing the transmission efficiency of said second path in response to signals derived from the output circuit of said demodulator.

7. A signal-modulated carrier wave receiving system as defined in claim 6, wherein said first rectifier circuit includes a load network and said second rectifier circuit includes a second load network, said first network having a short time constant relative to the time constant of said second network, whereby a sudden increase of modulation signal intensity causes the rectifier circuit having the shorter time constant to control the transmission efficiency of said second path.

8. A signal-modulated carrier wave receiving system as defined in claim 7, wherein the load network of said first rectifier circuit includes a resistor-capacitor network, said network having a relatively short time constant for developing a rectified voltage which is negative relative to ground, and wherein the load circuit of said second rectifier includes a resistor-capacitor network having a relatively long time constant for developing a rectified voltage which is positive relative to ground.

9. A signal-modulated carrier wave receiving system as defined in claim 8, wherein said means responsive to said delay voltage includes means for opposing said negative voltage with a predetermined magnitude of said positive rectified voltage, and wherein said opposing means includes a diode and said positive voltage source being connected to said diode to render the same normally non-conductive.

ROBERT E. SCHOCK.

REFERENCES CITED

The following references are of record in the file of this patent:

UNITED STATES PATENTS

| Number | Name | Date |
|---|---|---|
| 1,950,145 | Hentschel | Mar. 6, 1934 |
| 2,039,666 | Schade | May 5, 1936 |
| 2,093,095 | Peterson | Sept. 14, 1937 |
| 2,144,304 | Braden | Jan. 17, 1939 |
| 2,144,605 | Beers | Jan. 24, 1939 |
| 2,194,552 | Hunt | Mar. 26, 1940 |
| 2,200,037 | Mountjoy et al. | May 7, 1940 |
| 2,207,094 | Getaz | July 9, 1940 |
| 2,231,704 | Curtis | Feb. 11, 1941 |
| 2,236,497 | Beers | Apr. 1, 1941 |
| 2,261,951 | Bloch | Nov. 11, 1941 |
| 2,331,360 | Tuckerman | Oct. 12, 1943 |
| 2,385,212 | Konrad | Sept. 18, 1945 |